(12) United States Patent
Palmer et al.

(10) Patent No.: US 12,321,211 B2
(45) Date of Patent: Jun. 3, 2025

(54) COMPONENT-LEVEL INSTRUMENT POWER MANAGEMENT

(71) Applicant: VIAVI SOLUTIONS INC., Chandler, AZ (US)

(72) Inventors: Craig Palmer, Woodbine, MD (US); Wei Chen, Potomac, MD (US); Nick Ghaemi, Great Falls, VA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 179 days.

(21) Appl. No.: 18/138,409

(22) Filed: Apr. 24, 2023

(65) Prior Publication Data

US 2023/0350475 A1  Nov. 2, 2023

Related U.S. Application Data

(60) Provisional application No. 63/337,280, filed on May 2, 2022.

(51) Int. Cl.
  *G06F 1/28*   (2006.01)
  *G06F 1/32*   (2019.01)
  *G06F 1/3287* (2019.01)

(52) U.S. Cl.
  CPC .............. *G06F 1/28* (2013.01); *G06F 1/3287* (2013.01)

(58) Field of Classification Search
  CPC ....................................................... G06F 1/28
  See application file for complete search history.

(56) References Cited

U.S. PATENT DOCUMENTS

| | | | |
|---|---|---|---|
| 2008/0104430 A1* | 5/2008 | Malone | G06F 1/3203 713/300 |
| 2012/0198263 A1* | 8/2012 | Berke | G06F 1/3206 713/340 |
| 2014/0365787 A1* | 12/2014 | Sagar | G06F 1/3287 713/300 |
| 2016/0370843 A1* | 12/2016 | Gatson | G06F 1/3206 |
| 2019/0163250 A1* | 5/2019 | Lee | G06F 11/3062 |
| 2020/0026338 A1* | 1/2020 | Maddukuri | G06F 1/28 |
| 2022/0206549 A1* | 6/2022 | Leung | G06F 1/3228 |

FOREIGN PATENT DOCUMENTS

| | | | | |
|---|---|---|---|---|
| CN | 102473131 A | * | 5/2012 | ........... G06F 1/3203 |
| WO | WO-8607157 A1 | * | 5/1985 | |

* cited by examiner

*Primary Examiner* — Jaweed A Abbaszadeh
*Assistant Examiner* — Cheri L Harrington
(74) *Attorney, Agent, or Firm* — Mannava & Kang, P.C.

(57) ABSTRACT

Component-level, scene-based power management in a test, monitoring, or measurement instrument or system is provided by identifying one or more controllable components; determining a power consumption of the identified one or more controllable components; generating a system model based, at least in part, on the determined power consumption, where the system model includes one or more scenes, each scene defining a list of controllable components and respective power states for the list of controllable components; generating a scene table for the test instrument by selecting a plurality of scenes from the system model; and executing the selected scenes in the scene table at a runtime for the test instrument, where each scene is executed based on an operation mode of the test instrument.

18 Claims, 14 Drawing Sheets

```
class PowerManagementScenes {
public:
    typedef int (PowerManageable::*setStateCb_t)();
    typedef std::vector<std::pair<PowerManageable&, setStateCb_t> > components_t;
    typedef std::map<std::string, components_t> scenes_t;

PowerManagementScenes()=default;
    PowerManagementScenes(scenes_t&& scenes);
    ~PowerManagementScenes();

void execute(std::string scene_name);  ⟵ 732 void addSingleComponent2Scene(std::string scene_name,
        std::pair<PowerManageable&, setStateCb_t> component);
    void addMultipleComponents2Scene(std::string scene_name, components_t components);
    void deleteScene(std::string scene_name);

private:
    scenes_t m_scenes;  ⟵ 734
}
```

```
void blindScan::enableClockSynthesizerOutput()
{
    if (!m_isClockSynthesizerOutputEnabled) {
        std::cout << "blindScan::enableClockSynthesizerOutput()" << std::endl;
        m_isClockSynthesizerOutputEnabled = true;
        (m_rfParam->m_rfsARF.get())->enableClockSynthesizerOutput();
        m_powerManagementScenes->execute("scene_on")); } // 742
    }
} void blindScan::disableClockSynthesizerOutput()
{
    if (m_isClockSynthesizerOutputEnabled) {
        std::cout << "blindScan::disableClockSynthesizerOutput()" << std::endl;
        m_isClockSynthesizerOutputEnabled = false;
        (m_rfParam->m_rfsARF.get())->disableClockSynthesizerOutput();
        m_powerManagementScenes->execute("scene_off")); } // 744
    }
}
```

FIG. 7D

COMPONENT-LEVEL INSTRUMENT POWER MANAGEMENT

PRIORITY

This patent application claims priority to U.S. Provisional Patent Application No. 63/337,280, entitled "Component-Level Instrument Power Management," filed on May 2, 2022. Disclosures of the Provisional Patent Application are incorporated by reference hereby.

TECHNICAL FIELD

This patent application is directed to test, monitoring, and/or measurement instruments, and more specifically, to a system and method for component-level, scene-based power management in test, monitoring, and/or measurement instruments for communication systems.

BACKGROUND

Network test equipment manufacturers are shifting to providing test equipment that is modular, and that can support multiple tests through multiple modules. For example, Viavi™ is a network test equipment provider that provides network test equipment that includes a modular platform that includes the capability to connect different modules to the platform to perform different tests. Moreover, a significant portion of network test equipment are battery driven, portable instruments that are used in the field ranging from offices to remote locations.

Accordingly, providing adequate power to modular network test equipment may be challenging, because different modules and different test applications can have different power requirements. Furthermore, for portable equipment, a technician needs a reliable, long-lasting power supply so field testing can be performed without having to wait for the test equipment to be charged.

BRIEF DESCRIPTION OF DRAWINGS

Features of the present disclosure are illustrated by way of example and not limited in the following Figure(s), in which like numerals indicate like elements, in which:

FIGS. 7A-7D illustrate various screenshots showing parts of code for an operating application that performs power management for a test instrument, according to an example.

DETAILED DESCRIPTION

Figure 1:
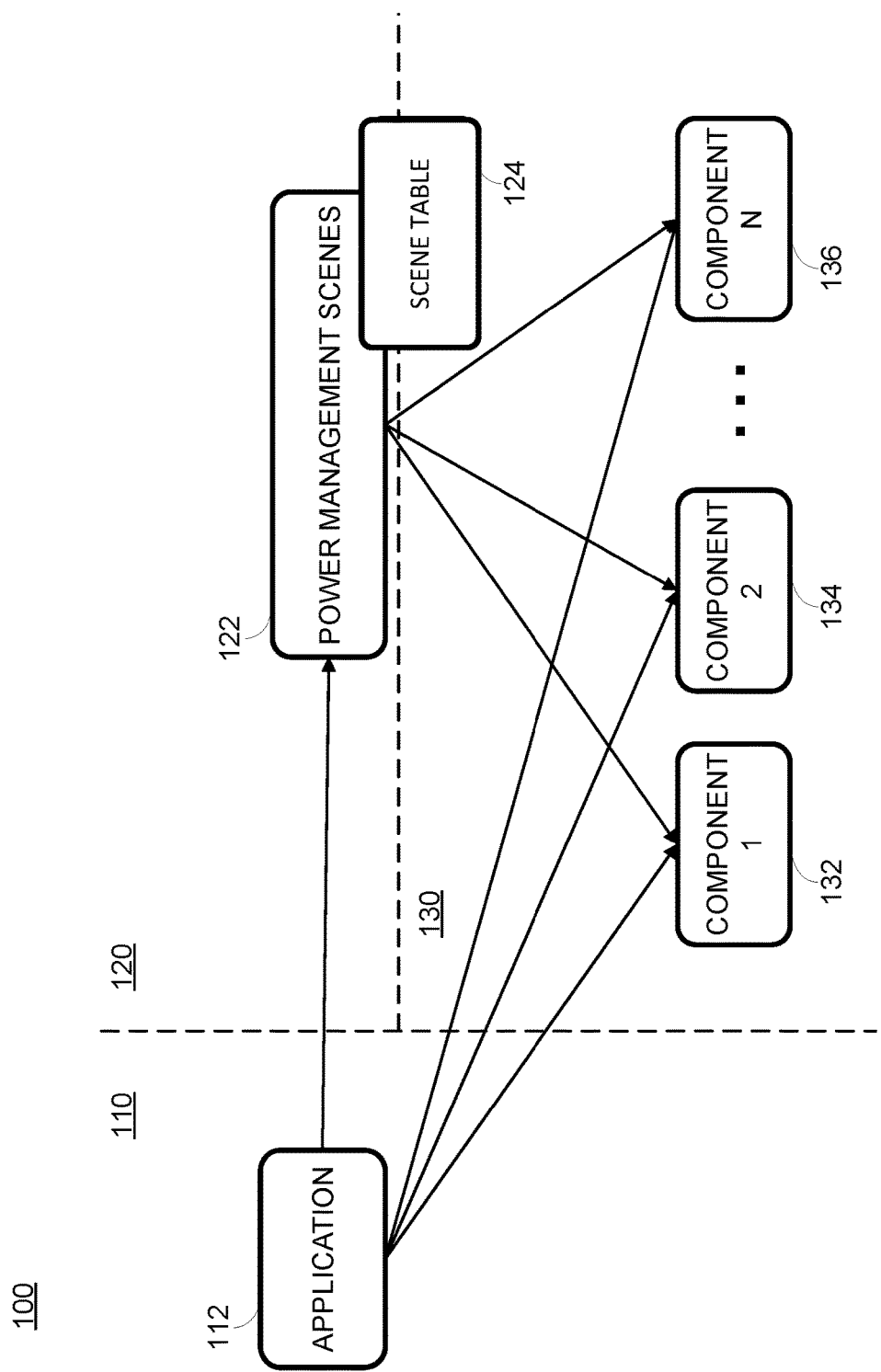
FIG. 1 illustrates a block diagram 100 of an operating application in a test instrument controlling power management at component-level, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As mentioned herein, providing adequate power to modular network test equipment may be challenging, because different modules and different test applications can have different power requirements. Especially for portable test instruments, which may rely on battery power, power management may be optimized by increasing battery capacity or reducing power consumption of the test instrument. Battery capacity increase may be subject to limitations of battery technology, device weight restrictions, etc.

In some examples of the present disclosure, component-level, scene-based power management for test, monitoring, and/or measurement instruments (herein referred to as "test instrument") may be implemented through analysis, implementation, and validation. Controllable hardware, software, and FPGA components of a test instrument may be identified. Combinations of identified components that may be turned on or off in various operational scenarios may also be identified. Based on power consumption of the individual components and/or combinations, system-wide power management models may be generated. The generated models and power behavior of the components/combinations may be leveraged to utilize a scene-based framework that allows scene-based control of the test instrument from an operating application. The models may be validated by monitoring power consumption and operational parameters of the test instrument. The scenes, which may be executed by an operating application at runtime and place any number of components in predefined states, may include define selected components (for a combination), respective states for the components (the states may be on/off or non-binary states), timing (delays before a state change), and comparable other parameters.

Some advantages and benefits of the systems and methods described herein are readily apparent. For example, the component-level, scene-based power management in portable test instruments may allow extended battery life through lower overall power consumption. In portable or non-portable instruments, less energy may be consumed with environmental benefits. Internal cooling systems may be operated less frequently or at lower capacity, resulting in even further power consumption reduction. Other benefits and advantages may also be apparent.

FIG. 1 illustrates a block diagram 100 of an operating application in a test instrument controlling power management at component-level, according to an example. As shown in the block diagram 100, an operating application 112 in an applications domain 110 may control operational functions of a test instrument. In a product domain 130, various product components 132, 134, 136 may perform different functions. The components 132, 134, 136 may be hardware components, software components, or modules and subsystems of an FPGA. In a library domain 120, power management scenes 122 may be stored, which may include one or more scene tables 124.

In some examples, hardware components may include individual circuits or subsystems such as local oscillators, mixers, frequency synthesizers, memory modules, and comparable ones. Hardware components may also include more complex circuits and subsystems such as phase-locked loop (PLL) integrated circuits (ICs). Software components may include any module within the operation application 112 or any independent module that performs operations involving power consumption by one or more hardware components. FPGA modules and subsystems may include any portion of an FPGA that controls operations of one or more parts of the test instrument.

As discussed herein, the power management scenes 122 may define whether one or more components within a combination of components are to be turned on or off in a given scenario (scene). A scene table 124 may define multiple scenes, which may be executed sequentially in a given scenario or individually. Thus, the operating application 112 may just need to execute a call for a particular scene without having to handle individual components. The power management scenes 122 may be compilation of scenes for any number products. The scene table 124, on the other hand, may be product specific based on a particular products architecture (i.e., hardware, software, and FPGA components, as well as configuration).

Figure 2:
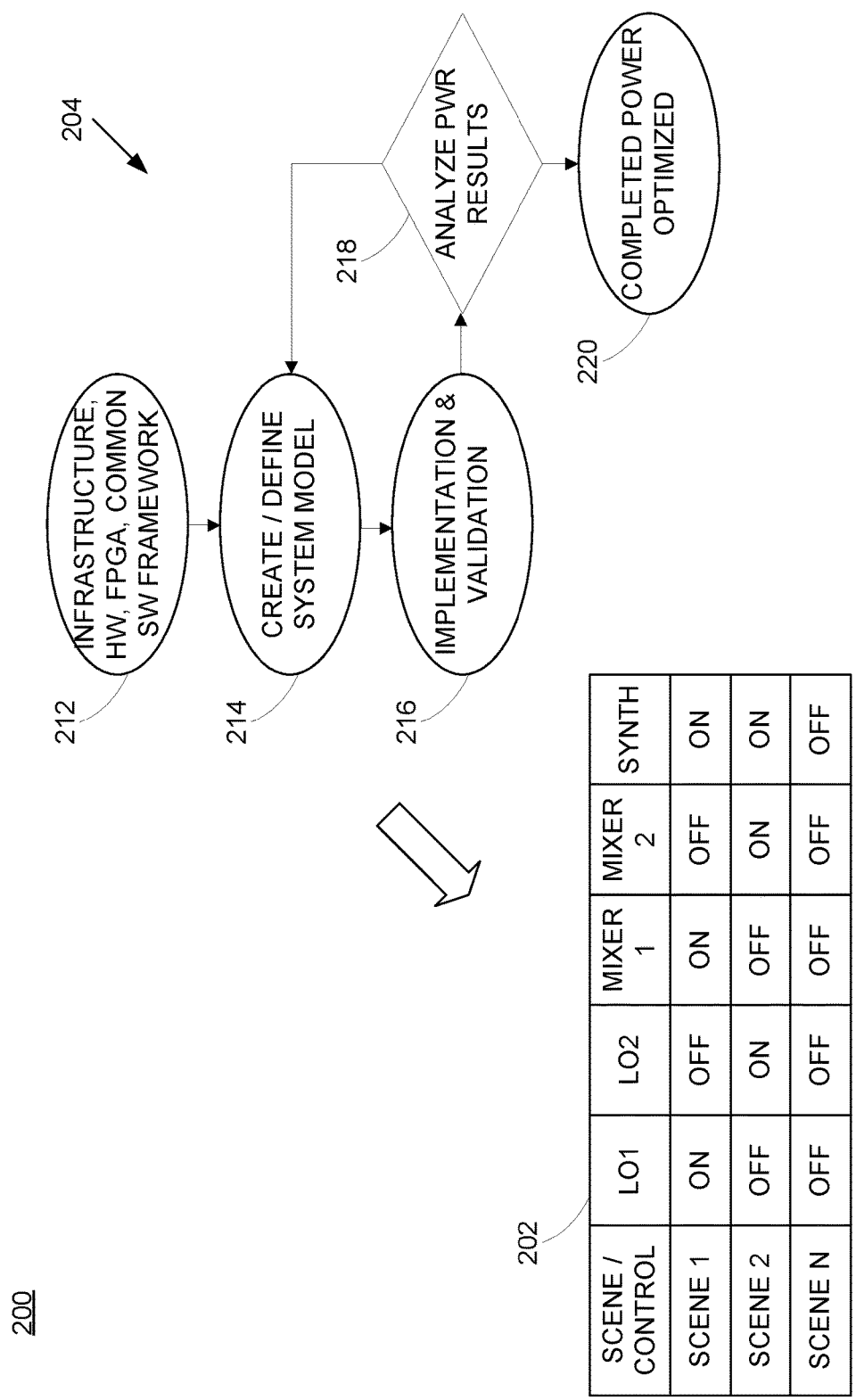
FIG. 2 illustrates diagram 200 of component-level power management process and an example scene table, according to an example.

FIG. 2 illustrates a diagram 200 of component-level power management process and an example scene table, according to an example. The diagram 200 shows an example scene table 202 and a process 204 for implementing component-level, scene-based power management.

The example scene table 202 includes states for two local oscillators, two mixers, and a frequency synthesizer of a test instrument. In a first scene, a first local oscillator is turned on, a second local oscillator is turned off, a first mixer is turned on, a second mixer is turned off, and the frequency synthesizer is turned on. In a second scene, the first local oscillator is turned off, the second local oscillator is turned on, the first mixer is turned off, the second mixer is turned on, and the frequency synthesizer is turned on. The scene table 202 may include any number of scenes, which may be executed sequentially in some examples, selectively in other examples. In another example scene, all five components may be turned off.

The process 204 may begin with analysis of product infrastructure and identification of controllable hardware, FPGA, and software components 212. Combinations of components that may be controlled as a group may also be identified along with power consumption of the components and combinations. The power consumption information may be used to determine high power consuming components and combinations to maximize an effect of component-level power management. Next, system-wide power management models may be created/defined 214 ascertaining scenes, a list of components and their respective states. Each scene may be executed to place the listed components in the listed states sequentially with other scenes or individually. The created models may also include a timing. For example, transition from one scene to another may not be immediate but may include a predefined delay.

In some examples, a model may include a scenes library covering scenes for any number of products (e.g., test instruments in a family of instruments) and/or any number of configurations. A test instrument may be configurable with different hardware or software arrangements such as having different hardware modules plugged in, being configured to perform certain tests, etc. Thus, the scenes library may include generic scenes for more than one particular product configuration. For each product and configuration, a scene table may be formed selecting scenes applicable to that particular product and/or configuration.

In an implementation and validation phase 216, a scene table for a selected test instrument and configuration may be used to execute the different scenes as the test instrument goes through different operational stages. The effect of the component-level, scene-based power management may be monitored by analyzing power consumption 218 as the scene table is implemented. The implementation and analysis may be an iterative process, where the generated model may be adjusted based on the power consumption analysis. Once the power consumption is reduced to a sufficient level 220, the model may be validated and implemented at the product for execution at runtime. The decision whether the power consumption is reduced sufficiently may be based on a threshold (e.g., 75% of initial consumption), a fixed power level, or dynamic.

Figure 3A:
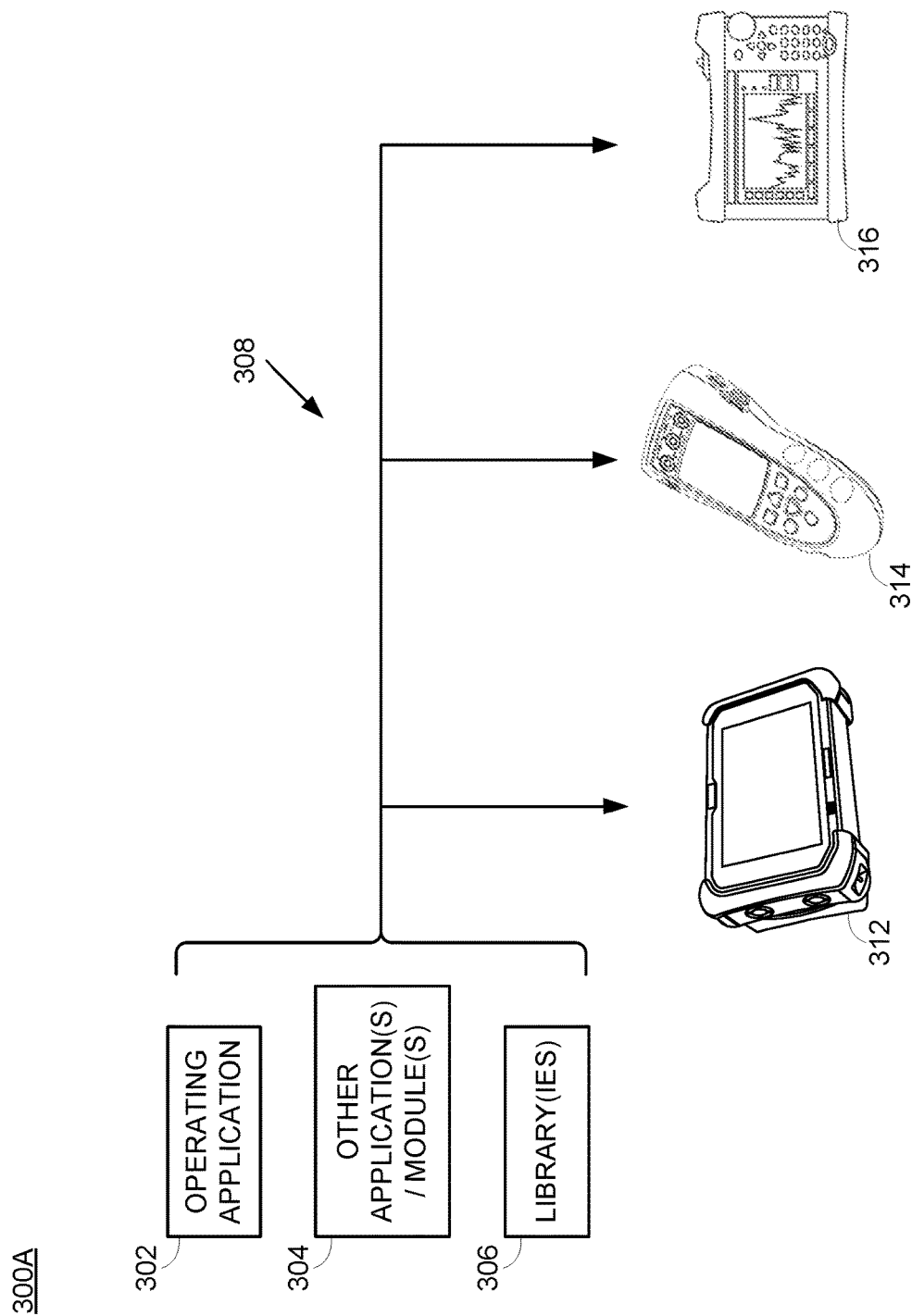
FIG. 3A illustrates various test, monitoring, and/or measurement instruments with operating application and associated software, according to an example.

FIG. 3A illustrates various test, monitoring, and/or measurement instruments with operating application and associated software, according to an example. Diagram 300A shows example test instruments portable optical spectrum analyzer (OSA) 312, handheld cable and antenna analyzer 314, and RF network tester 316. As shown in the diagram, an operating application 302 may be loaded (308) to each instrument and executed to perform various functions. In some examples, the test instrument(s) may include other applications or modules 304. For example, a cellular communication application may allow the test instrument to communicate with a server over cellular networks. Each instrument may also include one or more libraries 306. The libraries may store data and executables such as subroutines.

The operating application 302, any other applications or modules 304, and libraries 306 may be loaded (308) to the portable OSA 312, handheld cable and antenna analyzer 314, and RF network tester 316 at manufacturing. In some examples, updates to the applications or library contents may also be provided in the field through wired or wireless communications. Thus, adjustments (improvements) to the models (scene library) based on continued testing and validation, new configurations, etc., may be provided to test instruments in the field. Example test instruments may also include, but are not limited to, Quad Small Form-factor Pluggable (QSFP) and SFP Monitors; optical time domain reflectometers (OTDRs); coarse wavelength division multiplexer (CWDM) analyzers; and other network, RF and optical network test instruments.

Figure 3B:
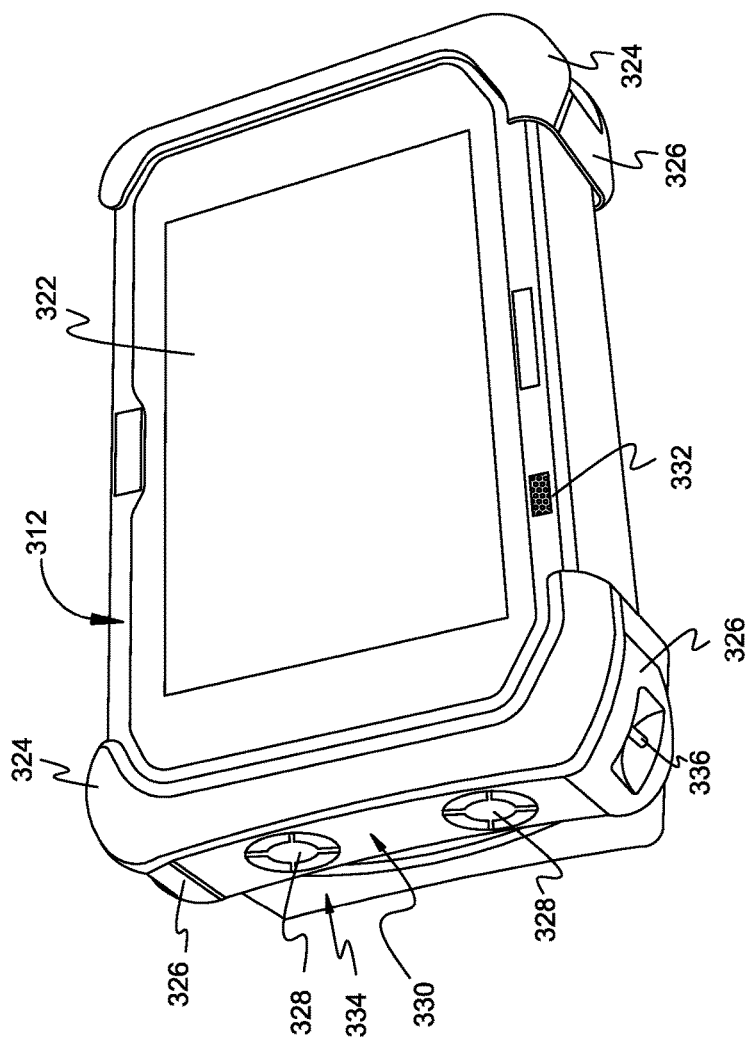
FIG. 3B illustrates a perspective view of a modular test instrument, in which an operating application may manage power, according to an example.

FIG. 3B illustrates a perspective view of a modular test instrument, in which an operating application may manage power, according to an example. Diagram 300B in FIG. 3B shows portable OSA 312 as an example test instrument. Portable OSA 312 may be removably connectable to field replaceable modules for cell site installation, testing, measurement, and maintenance, for example. According to an example, portable OSA 312 may include removably connectable protective enclosure 324, and a removably connectable base module 334. According to an example, the portable OSA 312 may include a display 322 that provides user control and information. According to an example, display 322 may be a touch screen, e.g., liquid crystal display (LCD) touchscreen. The OSA 312 may provide information including, but not limited to measurement results, graphic displays, network information, analysis results, test reports, and an interface control with a workstation or server. The base module 334 may provide hardware, software and firmware, described in greater detail below, to control the portable OSA 312.

According to the illustrated example of FIG. 3B, ventilation ports 328 may be provided to the outer structure to facilitate internal cooling of components by way of an internal cooling unit. Loudspeaker 332 may provide audio information. Support structures 336 for attachment of a support strap (not shown), elastomeric bumpers 326 may also be provided for impact protection.

As the portable OSA 312 may be battery operated, prolonged use without recharge in the field may be desired by technicians. Thus, component-level, scene-based power management may allow extended battery life through reduction of power consumption while the portable OSA 312 operates without compromising operational performance.

Figure 4:
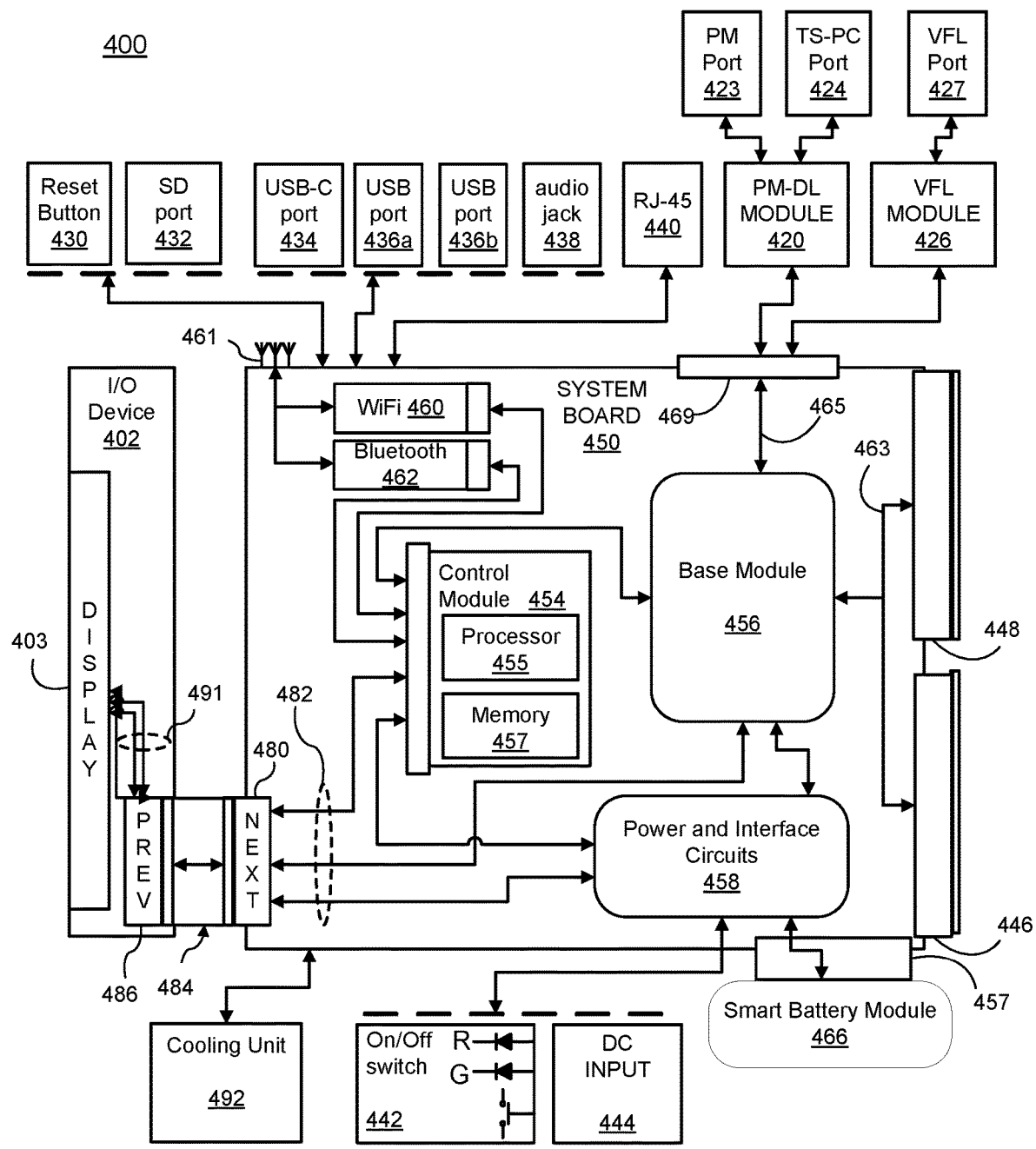
FIG. 4 illustrates a high-level system diagram 400 of a modular test instrument, in which an operating application may manage power, according to an example.

FIG. 4 illustrates a high-level system diagram 400 of a modular test instrument, in which an operating application may manage power, according to an example. The modular test instrument may include a system board 450 with interfaces to removably connect to various solution modules and expansion modules to form the test instrument. System board 450 may removably connect to I/O device 402, which houses and supports display 403. According to an example, I/O device 402 may be embodied in a modular housing, which may be removably connectable to test instrument. According to an example, display 403 may be disposed within I/O device 402 and a GUI may be generated on the display 403 to provide user control of the test instrument for testing and measurement. The modular housing of I/O device 402 may permit both field replaceability and connection of various additional solution modules.

System board 450 may include a control module 454. According to an example, the control module 454 may include processor 455 and memory 457. According to an example, the processor 455 may include a programmable and replaceable processor module/card used in a test instrument system where pluggable/upgradable/flexible processor selection is desired. According to an example, processor 455 may be a multi-core, programmable, processor. According to an example memory 457 may be a DRAM, an SRAM, or similar memory devices. Processor 455 processes software instructions stored in the memory 457.

According to an example, control module 454 may facilitate a flexible processor choice for processor 455 accepting any suitable processor. Control module 454 may power to processor 455 and be versatile small form factor device. In some examples, the control module 454 may be a replaceable processor module/card used in a system where pluggable/upgradable/flexible processor selection is desired. The control module 454 may also be fitted with other low-power System-on-Chip (SoC) architectures.

According to an example, test instrument may include an optional PM-DL module 420, also known as a power meter/datalink optical sub module. According to an example, the PM-DL module 420 may connect to the base module 456 through base module bus 465 and base module interface 469. The PM-DL module 420 may include a power meter (PM) port 423 and a Talkset-Datalink (TS-PC) port 424. According to an example, test instrument may also include a VFL module 426 to provide visual fault location. The VFL module 426 may connect to the base module 456 through the base module bus 465 and the base module interface 469. The VFL module 426 may include a VFL optical port 427. According to examples, various combinations of power meter module (included in PM-DL module 420), talkset datalink module (included in PM-DL module 420), and visual fault locator module 426 may support various communication connection combinations.

System board 450 may include base module 456, which may be an interface. The base module 456 may provide an architecture to support connection to a plurality of additional modules. Base module 456 may connect to any number of parallel/serial or other communication ports such as PM port 423 and TS-PC port 424 via PM-DL module 420, and/or VFL port 427 via VFL module 426 through a base module bus 465 with base module interface 469. Base module 456 may also connect to expansion interfaces 446 and 448 with expansion bus 463. Base module 456 may further connect to base module backplane interface 480 through base module backplane 482.

According to an example, an I/O device 402 may be removably connectable to the test instrument. The I/O device 402 may include a display 403 that provides user control and user information, a listing of predetermined tests to be executed (i.e., a predetermined test plan), a listing of reports to be compiled, a compilation of executed test results in test reports, and interface control for communication with a workstation or server. The I/O device 402 may also include an I/O backplane 491 that connects to a base module backplane 482 of the test instrument at a backplane interface junction 484. The I/O backplane interface 486 may form part of I/O device 402 and a base module backplane interface 480 may form part of test instrument. Together, the I/O backplane interface 486 and the base module backplane interface 480 may form junction backplane interface junction 484. The designation of PREV and NEXT provide a reference for connectivity of various modules in various configurations to the base module backplane 482.

According to an example, the I/O device 402 may be contained in a removable modular housing. This permits both field replaceability and access within the platform to insert additional modules. According to an example, the display 403 may support a number of resolutions and touch interface capabilities. According to an example, various screen sizes may be provided based on test instrument size. The display 403 may also be backlit to provide readable brightness in an outdoor environment.

According to an example, power and interface circuits 458 may receive power from internal smart battery module 466 by way of smart battery interface. The smart battery module 466 may provide information such as voltage, discharge current, temperature, and state of charge of the battery pack. According to an example, the smart battery module 466 may include a dedicated battery internal to the structure of the test instrument. The dedicated internal battery may be field replaceable and also rechargeable via power and interface circuits 458. The power and interface circuits 458 may also receive power by way of DC input 444. Power and interface circuits 458 may also receive power by way of an Expansion Module containing a smart battery. Operation of test instrument may be initiated or turned off by way of On/Off switch 442. Accordingly, the internal battery within smart battery module 466 may be recharged when DC power is supplied by way of DC input 444. The internal circuitry of test instrument may be cooled by cooling unit 492, which may include a fan, a heat sink, a temperature senor and/or combination thereof. According to an example, control of a fan within cooling unit 492 may be provided by way of a temperature sensor that provides a temperature indication signal to control module 454, which in turn controls operation of the fan.

Reset button 430 may provide a hard reset of the test instrument. Reset button 430 may be depressed with a small object, such as an extended paperclip. SD port 432 may provide removable storage to test instrument by receiving a removable SD card (e.g., a micro-SD card). The SD card may provide memory for storing customer data, setup configurations, reports, and/or test results. One or more of USB ports 436a and 436b may provide support for connection of USB peripherals. Further serial communication ports may include, but are not limited to, USB-C port 434 similar ones that may provide a debug-serial-port to support testing and troubleshooting of test instrument, and an external audio interface (and/or headset). An audio jack 438 may provide a direct audio interface by accepting a plug. Ethernet port 440 may provide Ethernet management.

Wireless network module 460 may provide a wireless network interface to test instrument by way of communication between antenna 461 and control module 454. Bluetooth module 462 may provide a Bluetooth interface to test instrument by way of communication between antenna 461 and control module 454. According to an example, several wireless options, such as Wi-Fi, Bluetooth, and other configuration choices, may be supported.

According to an example, internal smart battery module 466 includes a single battery, which is field replaceable. Battery access may be provided without need to disassemble/remove any of its Modules. According to another example, dual battery support may be provided by connection of another smart battery to expansion interface 446 or expansion interface 448. An additional smart battery may provide additional power to support module scalability.

While specific components, modules, and configurations are discussed in conjunction with a test instrument herein, the illustrated components, modules, and configurations are not intended to be limiting. Component-level, scene-based power management in a test instrument may be implemented with other components, module, and configurations using the principles described herein.

Figure 5A:
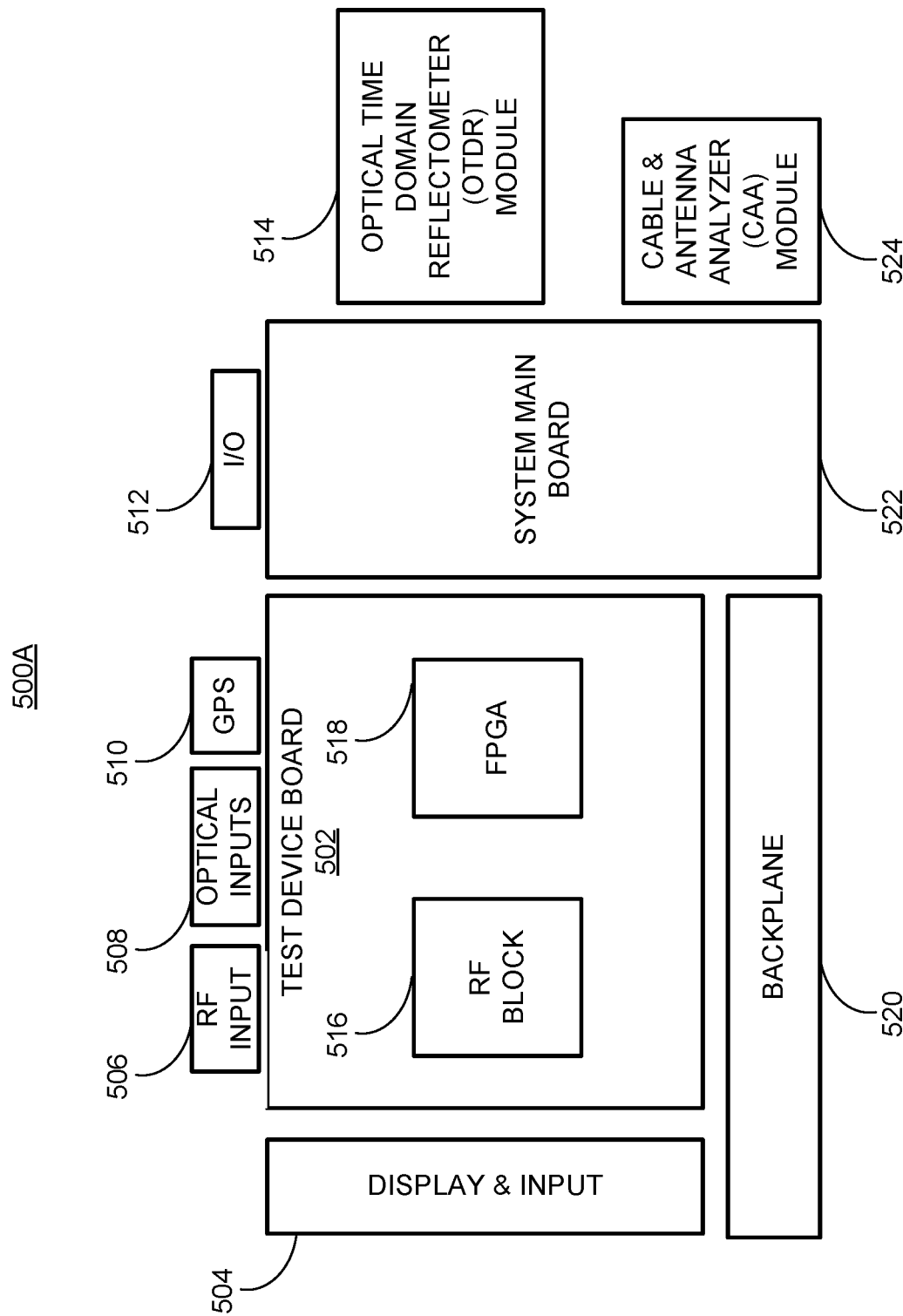
FIG. 5A illustrates diagram 500A of hardware components and subsystems of a test instrument that may be analyzed for controllability and power consumption, according to an example.
Figure 5B:
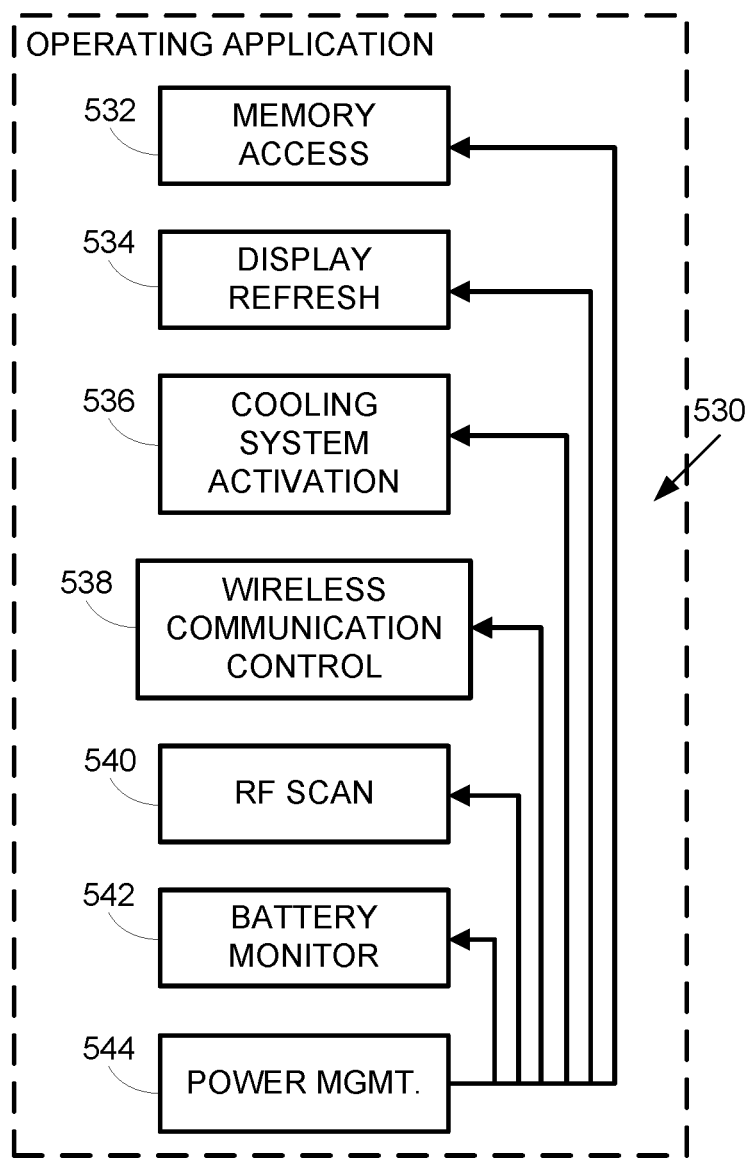
FIG. 5B illustrates diagram 500B of software components of a test instrument that may be analyzed for controllability and power consumption, according to an example.

FIG. 5A illustrates diagram 500A of hardware components and subsystems of a test instrument that may be analyzed for controllability and power consumption, according to an example. As shown in diagram 500A, example hardware components may include, but are not limited to, an RF block 516, a display and input subsystem 504 (e.g., touch-enabled display), a field programmable gate array (FPGA) 518 on a test device board 502. A backplane 520 may enable communication and power exchange between different components and a system main board 522, which may include additional components such as processor(s), memory modules (DDRs), a power module, optical modules, clocks (e.g., oscillators), etc. The system main board 522 may also provide interface for plug-in operational modules such as an optical time domain reflectometer (OTDR) module 514 and a cable and antenna analyzer (CAA) module 524. Various input modules such as RF input 506, optical input(s) 508, global positioning system (GPS) input 510, and other input/output modules 512 (e.g., USB, Ethernet, etc.) may be connected to the test device board 502 and/or the system main board 522. One or both of the test device board 502 and the system main board 522 may include further subsystems such as a cooling subsystem, an analog-digital converter (ADC), display driver(s), audio and/or video output, wireless network communication module(s), wired communication module(s), and so on.

In some examples, the system architecture may be created by defining a power tree (power consumption of various components) and components and subsystems that consume higher power (e.g., microprocessor, LCD, FPGA, memory, optics, etc.) may be identified. Controllability (whether these components and subsystems can be turned on or off) may be confirmed. Once the power consumption information is obtained, various hardware components may be grouped in combinations of hardware components and/or together with software and/or FPGA components in order to generate scenes that define which components can be turned off under which circumstances and for how long.

In some examples, the FPGA 518 may include various components and subsystems for accessing different memories, controlling activation and operation of various OSA subsystems (e.g., frequency synthesizer(s), logic circuitry, analysis circuitry, optical interface controls, etc.). In creating the architecture for the FPGA power management, a clocking and data path tree may be defined. Then, modules and subsystems that consume higher power may be identified and confirmed that these modules and subsystems can be turned on or off. Next, scenes may be generated that list which FPGA modules and subsystems (along with hardware and software components) can be turned off or on under different scenarios.

FIG. 5C illustrates diagram 500C of software components of a test instrument that may be analyzed for controllability and power consumption, according to an example. Diagram 500C shows example software modules for illustrative purposes. Depending on capabilities and complexity of a test instrument, the instrument may include any number of software modules within an operating application 530 or even separate from the operating application 530. Example modules may include a memory access module 532, a display refresh module 534, a cooling system activation module 536, a wireless communication control module 538, an RF scan module 540, a battery power monitoring module 542, and a power management module 544.

In some examples, the power management module 544 (also referred to as power management subsystem) may execute applicable scenes for a particular test instrument and activate or deactivate the other software modules depending on the operating mode. The power management module 544 may also control timing and sequence of the executed scenes, which may be stored in a subroutine library in the test instrument.

Figure 6A:
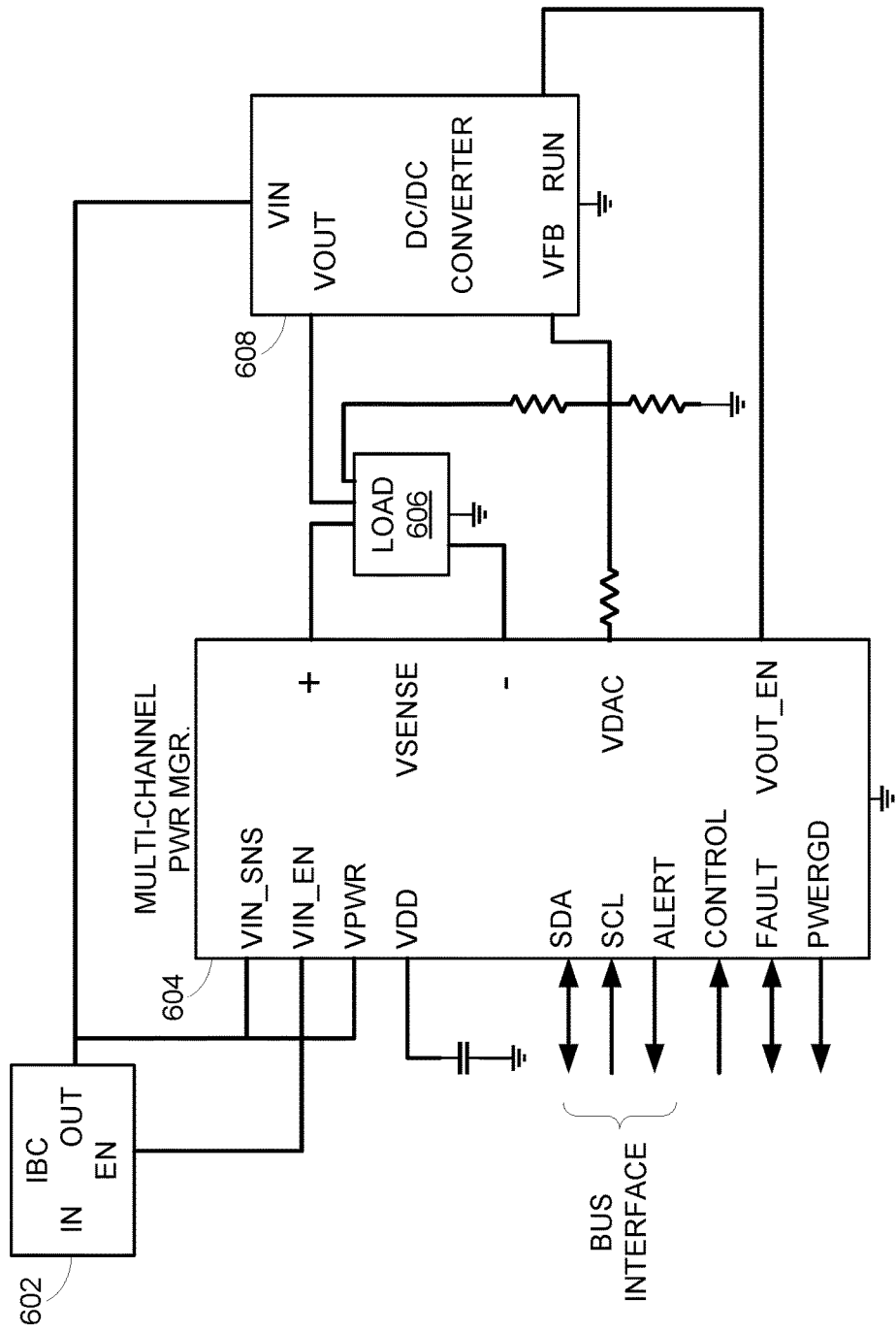
FIG. 6A illustrates diagram 600A of a power system manager, according to an example.

FIG. 6A illustrates diagram 600A of a power system manager, according to an example. A power system manager (also referred to as power management module or power management subsystem) may be used to sequence, trim (servo), margin, supervise, manage faults, provide telemetry, and/or create fault logs. Power management bus commands may support power supply sequencing, precision point-of-load voltage adjustment, and/or margining. As shown in the diagram 600A, a power system manager IC 604 may include multiple channels to monitor multiple power sources in the instrument. For illustration purposes only one channel is shown in the diagram. Detecting a voltage from a power source (DC/DC converter 608), the power system manager IC 604 may measure voltage from the power source and sense current of the load 606 and thereby monitor the power consumed by the load from the power source. In some examples, the power system manager IC 604 may also adjust the voltage output level of the power source (DC/DC converter 608). In some examples, a power rail monitor 602 may be installed in the test instrument and be accessible from the instrument processor(s) to monitor power consumption and optionally control voltage levels.

Figure 6B:
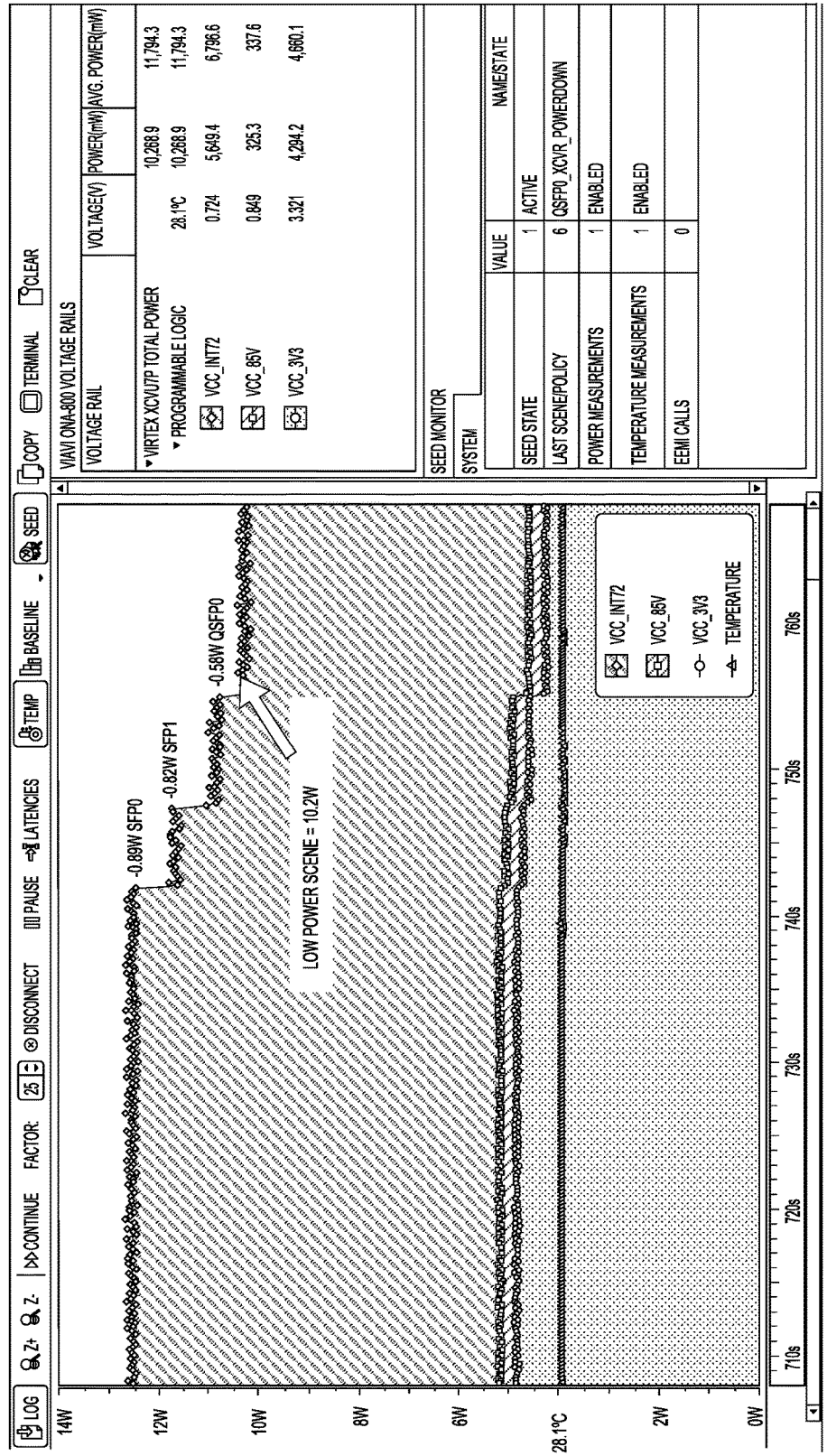
FIG. 6B illustrates screenshot 600B of power consumption monitoring application monitoring various power rails of a test instrument to determine power consumption of hardware, software, and/or FPGA components, according to an example.

FIG. 6B illustrates screenshot 600B of power consumption monitoring application monitoring various power rails of a test instrument to determine power consumption of hardware, software, and/or FPGA components, according to an example. The power consumption monitoring application may be executed on a computing device communicatively coupled to the test instrument. The screenshot 600B may be the graphical user interface of a power management application or module showing power consumption levels and changes for different hardware, FPGA, and software components graphically and textually. Thus, a user may not only see power consumption for different components graphically, but also read numeric values, identification of the components, component states, as well as other information such as temperature, input power, etc.

In some examples, DDR memory, optical transceivers, PLLs, ADC module(s), etc. may be placed in power saving states through the use of a scene table and their power consumption monitored and recorded. Similarly, an FPGA may have any number of independent modules such as clock gating, resets, etc., all of which may not be needed to be active simultaneously.

Figure 7A:
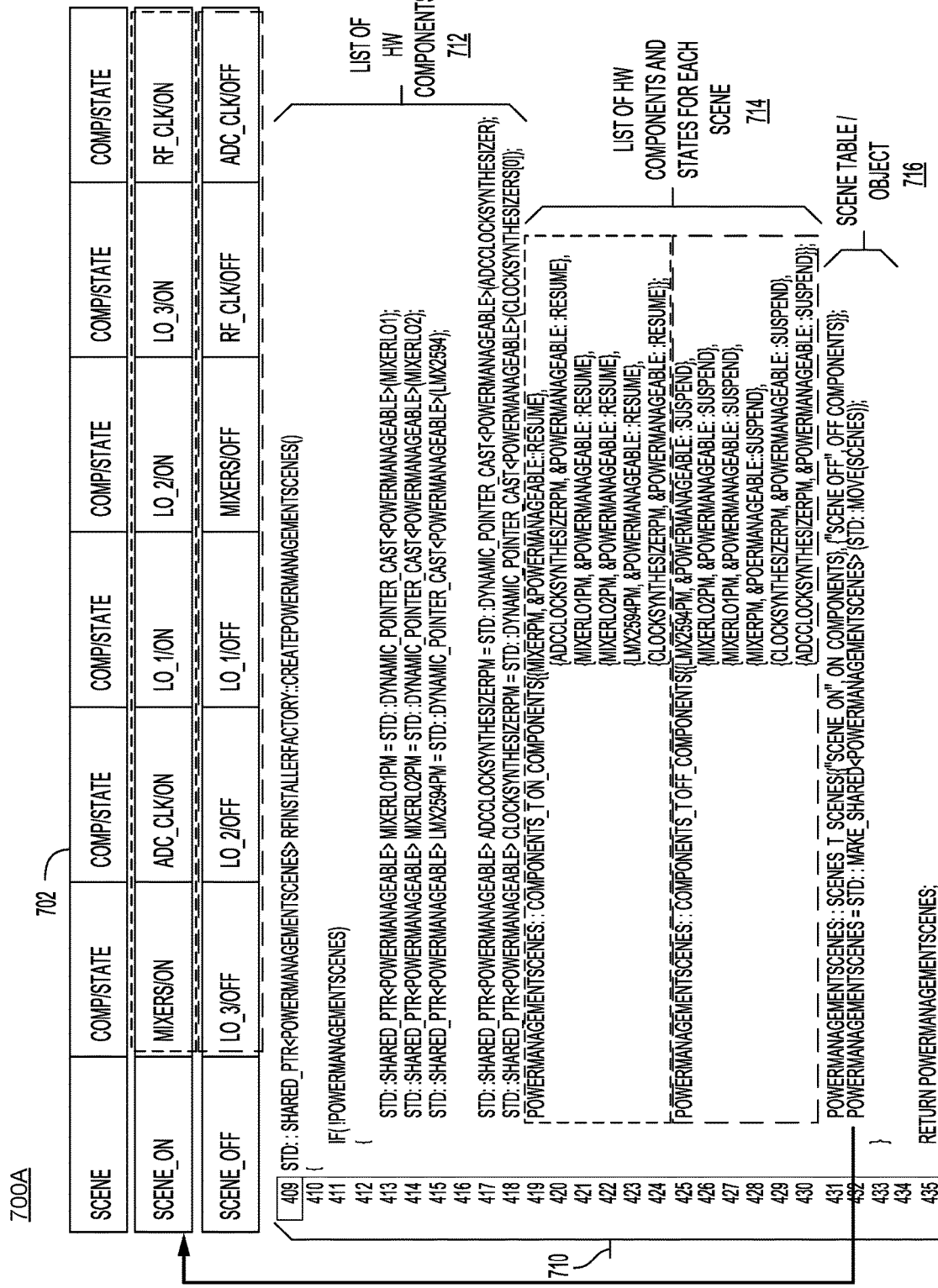

FIGS. 7A-7D illustrate various screenshots showing parts of code for an operating application that performs power management for a test instrument, according to an example. Diagram 700A in FIG. 7A shows an example scene table 702 with two scenes, which may be stored in the scene library as objects 716. The library code 710 may include a list of hardware components 712, a list of hardware components and their respective states for each defined scene 714, and the individual scene objects 716, which may be called by the operating application or power management module to execute a particular scene and put the listed components in the listed states. While hardware components and scenes listing hardware components are shown in the diagram as an illustrative example, software components, FPGA components, and their combinations may also be listed in various scenes, as described herein.

Figure 7B:
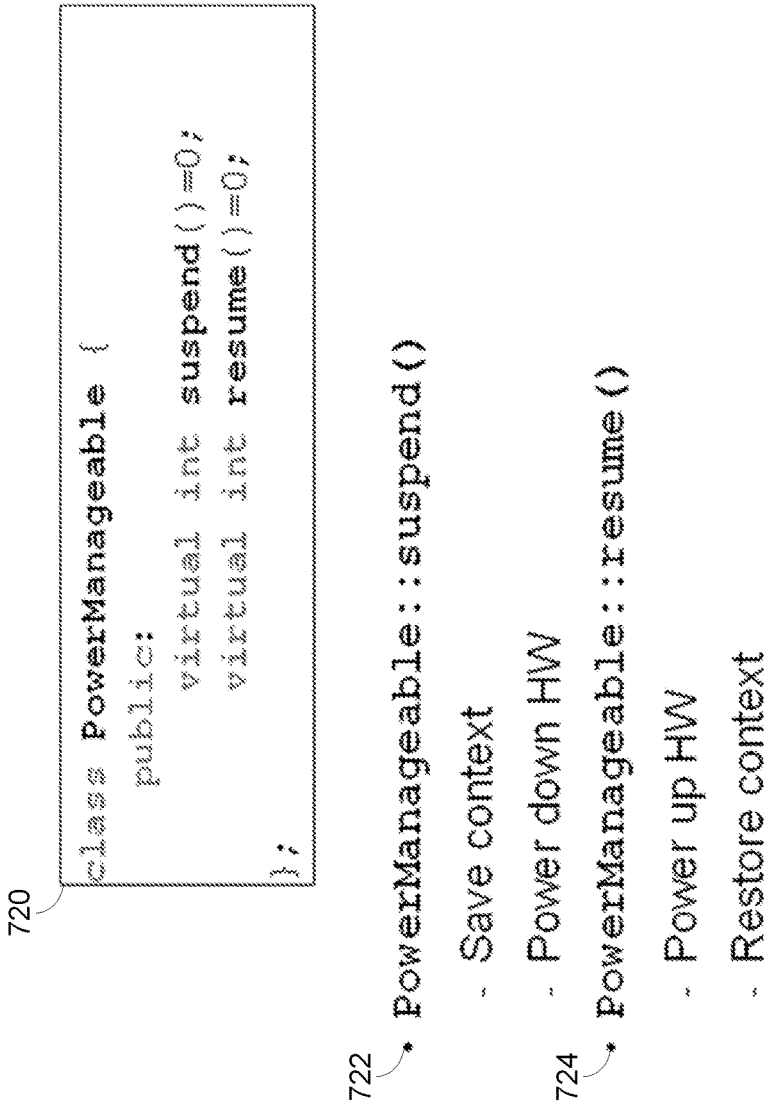

Diagram 700B in FIG. 7B shows an example class definition of a power manageable component 720 with two states (suspend 722 and resume 724) for deactivating or activating the component in different operation modes. Some non-limiting example operation modes may include a test mode, a calibration mode, an analysis mode, etc. As shown in the diagram, a context for the component may be saved when it is suspended (turned off) and restored when the component resumes (turned on).

Diagram 700C in FIG. 7C shows the power management scenes class 730 in the scene library, where power manageable component objects, a scene execution application programming interface (API) 732, and a scene table 734 are defined. In some examples, the scene-based, component-level power management architecture may be defined through objects such that the operating application or the power management module may only need to call specific objects during execution to implement a power saving mode for a combination of hardware, software, and/or FPGA components.

Diagram 700D in FIG. 7D shows how the operating application may control runtime test instrument power management. As mentioned herein, the power management architecture may comprise a library of objects defining scenes (lists of components and respective states for different scenarios). Thus, the operating application code 740 may call a subroutine (execute a selected scene object) and place the components listed in that object into their respective power states. In the example code of diagram 700D, a "scene_on" object 742 is executed placing the components in the "scene_on" object in their listed respective states (some may be on, others may be off). Later, when the operation mode changes, a "scene_off" object 744 may be executed the components in the "scene_off" object placed in their listed respective states.

While specific configurations such as the arrangements of a number of components are shown in conjunction with test, monitoring, and measurement instrument and systems herein, the illustrated configurations are not intended to be limiting. Component-level, scene-based power management in a test instrument may be implemented with other configurations and components using the principles described herein.

Figure 8:
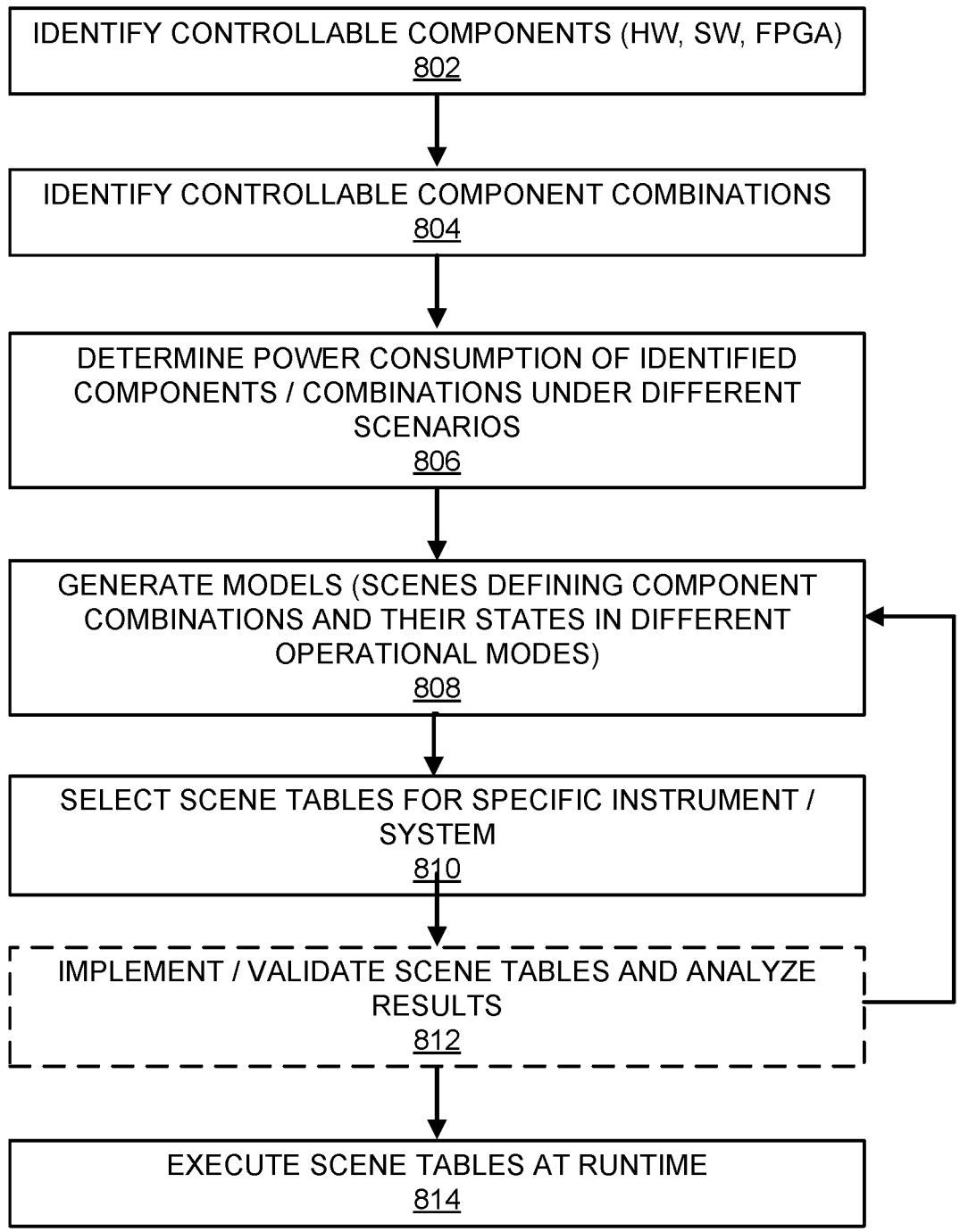
FIG. 8 illustrates a flow chart of a method for controlling power management of a test instrument at component-level, according to an example.

FIG. 8 illustrates a flow chart of a method for controlling power management of a test instrument at component-level, according to an example. The method 800 is provided by way of example, as there may be a variety of ways to carry out the method described herein. Although the method 800 is primarily described as being performed by the operating application 112 in FIG. 1 and/or one or more of its modules (e.g., power management module 544 of FIG. 5C), the method 800 may be executed or otherwise performed by one or more processing components of another system or a combination of systems. Each block shown in FIG. 8 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 802, controllable hardware, software, and FPGA components and subsystems of a test instrument in a particular configuration may be identified. Controllable components refer to components, subsystems, circuits, and the like, which may be turned on or off in different operating modes by a power management application of module. At block 804, controllable component combinations may be identified. For any given operational state some hardware, software, and FPGA components and subsystems may not be needed, and it may make operational sense to turn groups of components off or on at the same time. For example, one or multiple mixers may not be needed for a particular operation mode and may be turned off. If that mixer is associated with an oscillator that only provides input to that mixer, the oscillator may be turned off or on together with the mixer.

At block 806, power consumption of identified components and combinations may be determined (e.g., from specifications or actual monitoring) under different operational scenarios. Thus, a ranking of components and combinations may be made with regard to their power consumption, and higher power consuming components and combinations may be prioritized in power management to maximize an efficiency. At block 808, system models may be generated based on the identified and ranked components and combinations. The models may include scenes, which list any number of components and their states (e.g., on or off). Thus, the operating application may not need to manage each component for each scenario individually, but simply make a subroutine call to activate a scene and all components associated with that scene may be moved to the listed states (on or off).

At block 810, one or more scene tables may be selected for a specific test instrument or system in a particular configuration among a generic library of scenes, which may be applicable to a family of products and/or configurations. At optional block 812, the scenes in the scene table for the particular instrument and configuration may be implemented (executed) and validated by analyzing power consumption levels (along with operational parameters to ensure operation of the instrument is not affected). The optional validation may be an iterative process feeding back to block 808, where the generated models may be adjusted based on the analysis results.

At block 814, the validated scene tables may be executed in the test instrument at runtime putting various components and subsystems of the test instrument in power saving mode(s) under different scenarios, and thereby, reducing overall power consumption of the test instrument. If an instrument software or hardware configuration changes post-manufacturing, the scenes library and scenes table may be updated via software download and the power management aligned with the new configuration of the test instrument.

According to examples, power management in a test instrument or system may be provided by identifying one or more controllable components; determining a power consumption of the identified one or more controllable components; generating a system model based, at least in part, on the determined power consumption, where the system model may include one or more scenes, each scene defining a list of controllable components and respective power states for the list of controllable components; generating a scene table for the test instrument by selecting a plurality of scenes from the system model; and executing the selected scenes in the scene table at a runtime for the test instrument, where each scene may be executed based on an operation mode of the test instrument.

According to examples, a method of making the test instrument with component-level, scene-based power management described herein and a test instrument with component-level, scene-based power management described herein may be provided. Furthermore, a non-transitory computer-readable storage medium may have an executable stored thereon, which when executed instructs a processor to perform the methods described herein.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the apparatuses, systems, and methods described herein may minimize and/or reduce power consumption for test, monitoring, measurement, and analysis instruments and systems. It should also be appreciated that the apparatuses, systems, and methods, as described herein, may also include, or communicate with other components not shown. For example, these may include external processors, counters, analyzers, computing devices, and other measuring instruments or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A method for power management in a test instrument, comprising:
    identifying controllable components in the test instrument that are to be turned on or off by a power management application, wherein the test instrument is a portable equipment that operates on batteries and monitors and tests an optical network;
    identifying a combination of components, selected from the controllable components, that are to be turned off together at a same time in a given operational state of the test instrument;
    determining power consumption of the controllable components and power consumption of the combination of components under the given operational state of the test instrument;
    generating a system-wide power management model based, at least in part, on the power consumption of the controllable components and the power consumption of the combination of components, wherein the system-wide power management model comprises scenes, and wherein each of the scenes defines at least a list of the controllable components and respective on or off power states for each component in the list of the controllable components;

generating a scene table for the given operational state of the test instrument, the scene table comprising selected scenes from the scenes of the system-wide power management model, wherein one of the selected scenes in the scene table includes the combination of components that are to be turned off at the same time; and executing the selected scenes in the scene table, including turning the combination of components off together at the same time, to determine a power consumption level of the test instrument in the given operational state, wherein the system-wide power management model is adjusted based on the determined power consumption level of the test instrument.

2. The method of claim 1, further comprising:
executing the selected scenes in the scene table at a runtime for the test instrument, wherein each scene is executed based on an operation mode of the test instrument.

3. The method of claim 2, wherein the scenes of the system-wide power management model are stored as objects in a scenes library.

4. The method of claim 3, wherein executing the selected scenes in the scene table at the runtime comprises:
calling a scene object for execution by an operating application or a power management module.

5. The method of claim 1, wherein the controllable components include a hardware component, a software component, or a field programmable gate array (FPGA) component.

6. The method of claim 1, further comprising:
implementing the system-wide power management model by executing the selected scenes in the scene table under one or more operation modes;
monitoring and analyzing power consumption of components associated with the executed scenes and the test instrument; and
validating the system-wide power management model.

7. The method of claim 6, further comprising:
adjusting the scenes in the system-wide power management model based on the monitoring and analyzing.

8. The method of claim 1, wherein the system-wide power management model is generated for a particular configuration of the test instrument.

9. The method of claim 8, further comprising:
providing an updated scene table to the test instrument in response to a configuration change of the test instrument.

10. The method of claim 8, wherein the particular configuration of the test instrument is one or more of a software configuration, a hardware configuration, or an FPGA configuration.

11. A test instrument, comprising:
a plurality of hardware components;
a plurality of software components executed by a subset of the plurality of hardware components; and
a power management subsystem executed by a processor that is part of the plurality of hardware components, wherein the power management subsystem is to:
identify, from the plurality of hardware components and the plurality of software components in the test instrument, controllable components that are to be turned on or off by a power management application, wherein the test instrument is a portable equipment that operates on batteries and monitors and tests an optical network;
identify a combination of components, selected from the controllable components, that are to be turned off together at a same time in a given operational state of the test instrument;
determine power consumption of the controllable components and power consumption of the combination of components under the given operational state of the test instrument;
generate a system-wide power management model based, at least in part, on the power consumption of the controllable components and the power consumption of the combination of components, the system-wide power management model comprising scenes, and each of the scenes defining at least a list of the controllable components and respective on or off power states for each component in the list of the controllable components;
generate a scene table for the given operational state of the test instrument, the scene table comprising selected scenes from the scenes of the system-wide power management model, wherein one of the selected scenes in the scene table includes the combination of components that are to be turned off at the same time; and
execute the selected scenes in the scene table, including turning the combination of components off together at the same time, to determine a power consumption level of the test instrument in the given operational state, wherein the system-wide power management model is adjusted based on the determined power consumption level of the test instrument.

12. The test instrument of claim 11, wherein the power management subsystem is further to:
execute the selected scenes in the scene table at a runtime for the test instrument, wherein each scene is executed based on an operation mode of the test instrument.

13. The test instrument of claim 12, wherein the operation mode comprises a test mode, an analysis mode, or a calibration mode.

14. The test instrument of claim 11, wherein the controllable components include a hardware component, a software component, or a field programmable gate array (FPGA) component.

15. The test instrument of claim 11, wherein the power management subsystem is to execute the selected scenes in the scene table by introducing a delay in execution of one or more scenes of the selected scenes.

16. The test instrument of claim 11, wherein the test instrument is one of a portable optical spectrum analyzer (OSA), a cable and antenna analyzer, a radio frequency (RF) network tester, a network test instrument for Ethernet, a network test instrument for Common Public Radio Interface (CPRI), a network test instrument for optical transport network (OTN), a test instrument using a quad small form-factor pluggable (QSFP) monitor, a test instrument using a small form-factor pluggable (SFP) monitor, an optical time domain reflectometer (OTDR), or a coarse wavelength division multiplexer (CWDM) analyzer.

17. A power management subsystem for a test instrument, the power management subsystem to:
identify controllable components in the test instrument that are to be turned on or off by a power management application, wherein the test instrument is a portable equipment that operates on batteries and monitors and tests an optical network;

identify a combination of components, selected from the controllable components, that are to be turned off together at a same time in a given operational state of the test instrument;

determine power consumption of the controllable components and power consumption of the combination of components under the given operational state of the test instrument;

generate a system-wide power management model based, at least in part, on the power consumption of the controllable components and the power consumption of the combination of components, the system-wide power management model comprising scenes, and each of the scenes defining at least a list of the controllable components and respective on or off power states for each component in the list of the controllable components;

generate a scene table for the given operational state of the test instrument, the scene table comprising selected scenes from the scenes of the system-wide power management model, wherein one of the selected scenes includes the combination of components that are to be turned off at the same time; and execute the selected scenes in the scene table at a runtime for the test instrument, including turning the combination of components off together at the same time, to determine a power consumption level of the test instrument in the given operational state, wherein the system-wide power management model is adjusted based on the determined power consumption level of the test instrument.

18. The power management subsystem of claim 17, wherein the controllable components include a hardware component, a software component, or a field programmable gate array (FPGA) component of the test instrument.

* * * * *